United States Patent [19]

Van Dongen

[11] 4,087,172

[45] May 2, 1978

[54] DOCUMENT HANDLING APPARATUS

[75] Inventor: Marc Carlo Van Dongen, Zaventem, Belgium

[73] Assignee: Rank Xerox Ltd., London, England

[21] Appl. No.: 671,797

[22] Filed: Mar. 30, 1976

[30] Foreign Application Priority Data

May 6, 1975 United Kingdom ............... 19000/75

[51] Int. Cl.² ............................................ G03G 15/00
[52] U.S. Cl. ...................................... 355/14; 226/79; 226/101; 355/3 R; 355/50; 355/75
[58] Field of Search ................ 355/3 R, 3 SH, 14, 50, 355/51, 75, 76; 226/79, 101

[56] References Cited

U.S. PATENT DOCUMENTS

| 3,446,554 | 5/1969 | Hitchcock et al. | 355/75 |
| 3,448,906 | 6/1969 | Walsh et al. | 226/79 X |
| 3,480,364 | 11/1969 | Barnett | 355/75 |
| 3,588,244 | 6/1971 | Murgas et al. | 355/8 |
| 3,677,635 | 7/1972 | Van Auken et al. | 355/75 X |
| 3,804,514 | 4/1974 | Jasinski | 355/75 |

Primary Examiner—Fred L. Braun

[57] ABSTRACT

A xerographic copying apparatus adapted for copying either individual or fanfold originals. For the latter, a removable fanfold handler and feeder is provided with controls to permit positioning and advance of the fanfold sheets to be correlated with the copying apparatus operation.

2 Claims, 6 Drawing Figures

DOCUMENT HANDLING APPARATUS

This invention generally relates to document handling and particularly concerns an improved automatic web material feeder attachment for a copying machine.

It has been possible in the past to copy web material in the shape of fan fold computer forms on a copying machine by means such as shown in U.K. Pat. No. 1,223,426 and U.S. Pat. No. 3,804,514. In the embodiments set forth in these patents it has been possible to incrementally move a document material in the form of an endless web across the exposure platen of a copying machine and produce copies of the individual segments thereof. In each case however the apparatus required to effect the necessary movement, registration, etc. to allow accurate and reliable copying of the web requires major alteration to the machine that imposes on the machine a fixed, relatively complex mechanism which changes the upper working surface of the machine to make the copying of nonweb material different and more involved than it would be on unmodified copying machine arrangements. Thus, the prior types of mechanisms require replacement of the upper portions of the machine around the exposure platen which portions are each fixed in place integral with the machine and cannot be practically removed. They thereby, to a greater or lesser extent, inhibit use of the machine for the copying of nonweb material. The use of other accessories may also be limited by these modifications. Moreover, the relative greater complexity of these prior types of mechanisms and the inability to conveniently remove them presents greater risk of malfunction, the repair and maintenance of which could reduce the effective use of the machine.

It is therefore an object of the invention to provide a relatively simple, yet reliable and versatile document strip or web handling means which may be very quickly and easily attached to or removed from a substantially conventional copying machine. The basic function of the copying machine is not altered by the attachment or removal of the strip handling means.

It is a further object of the invention to provide control means which regulate the operation of the strip handling and copying machine in different modes of operation e.g. automatic or "manual" and allow quick and simple means of selecting the predetermined increment of document strip length which will move past the exposure station.

These objects as met by the invention described herein according to one aspect of which there is provided a document strip handling means for a copying machine comprising a document strip moving means for conveying an elongated document strip across an exposure station of said copying machine, a control means for regulating the operation of said document strip moving means and said copying machine to produce copies of portions of said strip as desired, and a support means for said moving means and said control means, said support means being readily fixable in predetermined position on said copying machine to convert said machine to handle strip documents and being readily removable from said machine for reconversion of said machine.

The control means may be arranged to provide for an automatic mode of operation wherein after an initial set up a selected predetermined length of document strip is advanced across the exposure station, stopped for the production of a predetermined number of copies and the cycle repeated until the entire strip has been copied.

A guide and platen cover may support and space the platen cover from the platen to allow the document strip to pass therebetween. In a manual mode of operation movement of the strip document may be effected by activation of direction control switches and copying effected by activation of a print switch.

A document strip handling means according to the invention for a copying machine will now be described by way of example with reference to the accompanying drawings in which.

Figure 1:
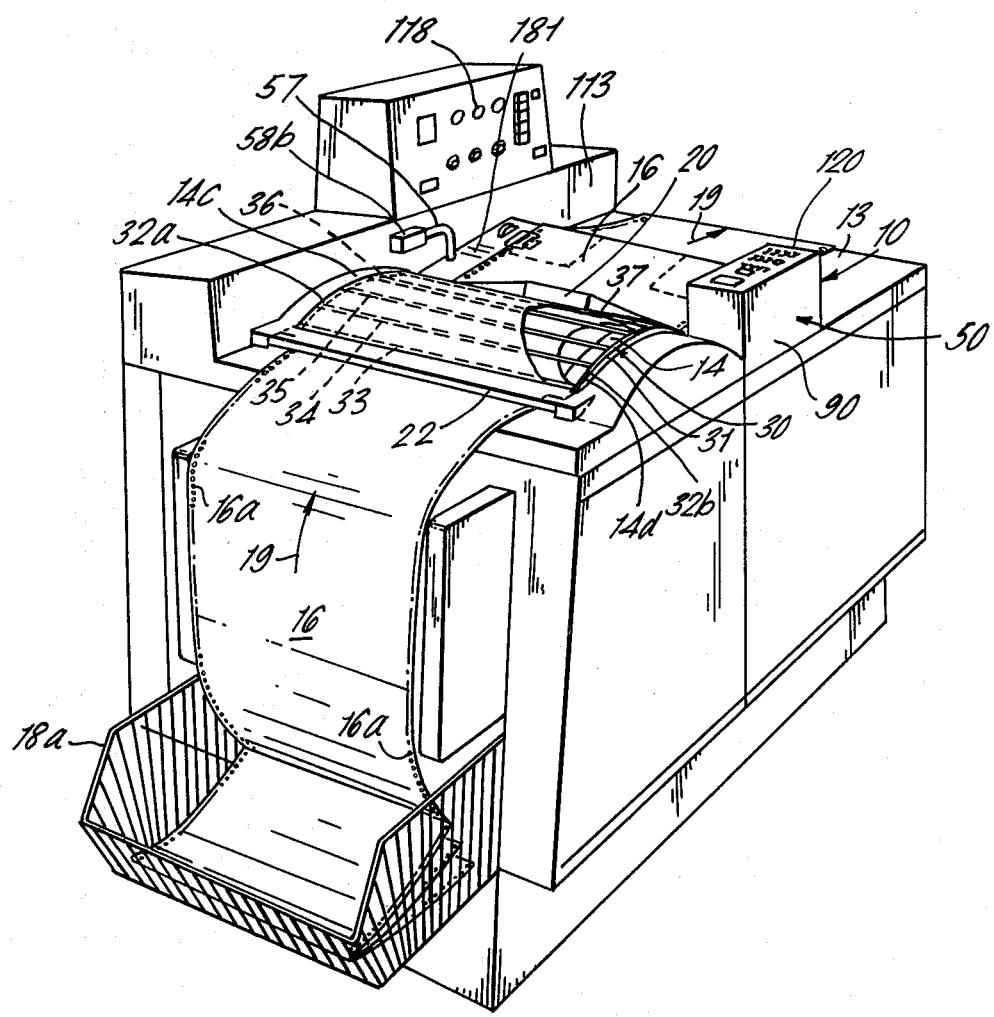
FIG. 1 is a perspective view of the document strip handling means in operative position on a copying machine.
Figure 2:
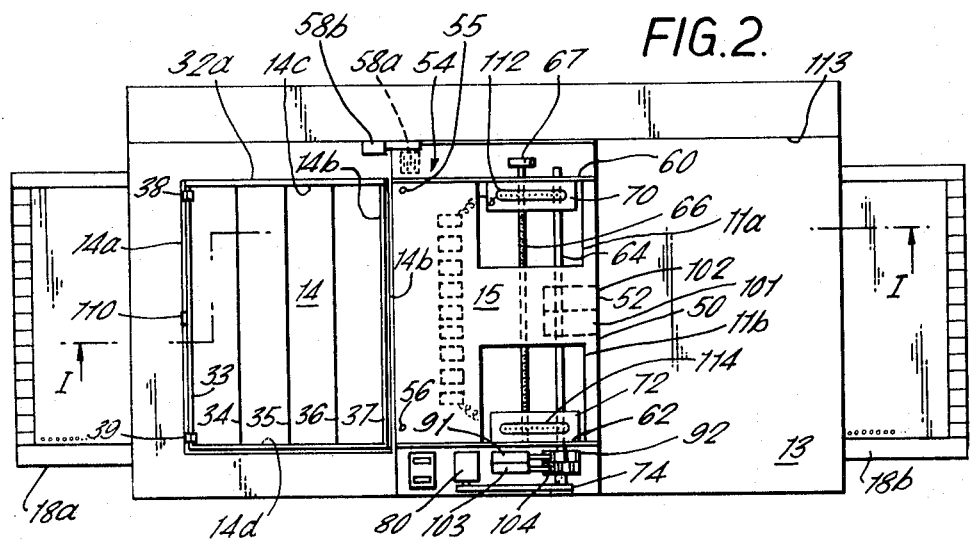
FIG. 2 is a plan view of the strip handling means attachment shown in FIG. 1 with cover portions removed.
Figure 3:
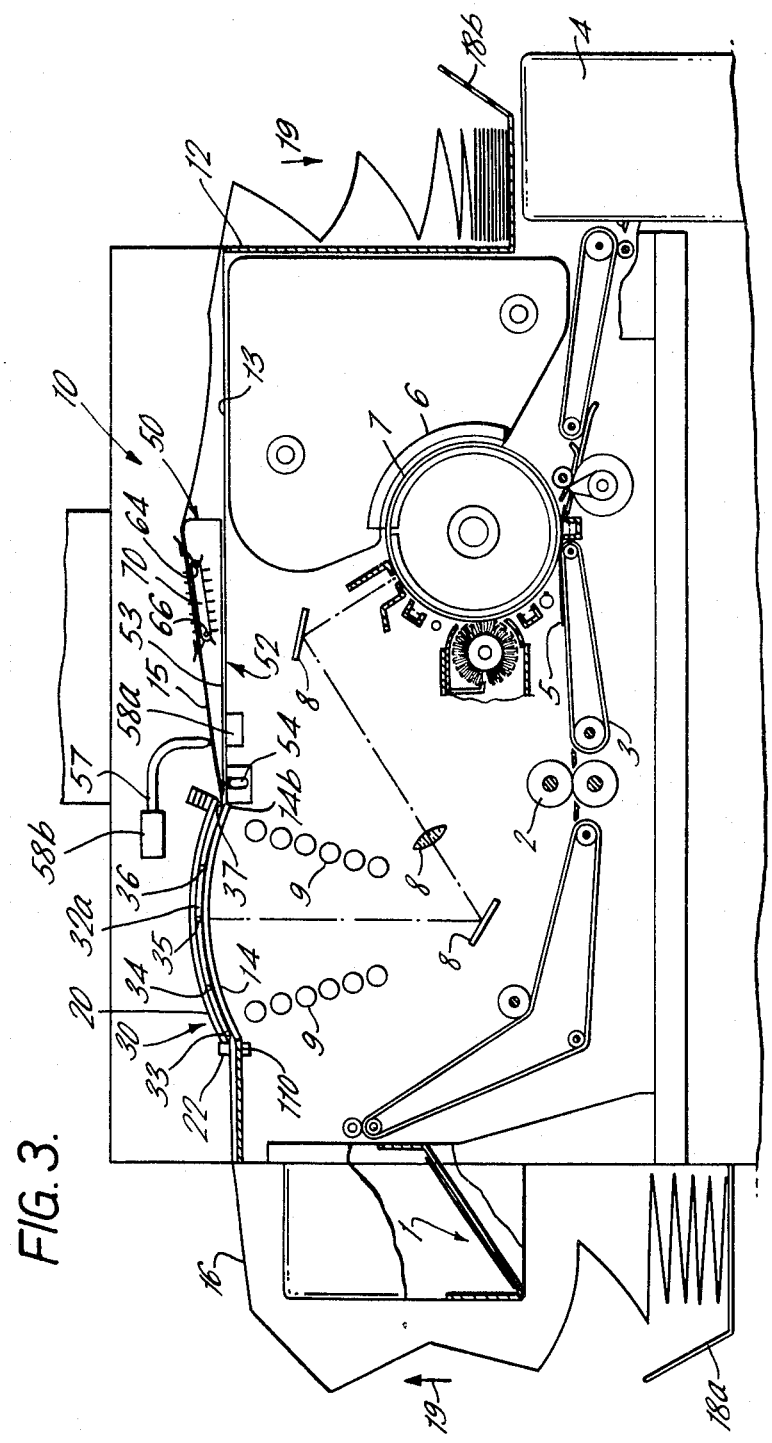
FIG. 3 is a schematic non-sectional view taken along line I—I in FIG. 2.

Referring to the drawings there is shown in FIGS. 1, 2 and 3 an example of a substantially conventional basic copying machine generally indicated at 12 having a document strip handling means 10 positioned on a surface 13 thereof. Commercial embodiments of the copying machine 12 may be identified as the XEROX or RANK XEROX model 7000. These copying machines 12 may be duplicators embodying the xerographic process wherein documents positioned stationary on a transparent platen 14 are illuminated by an arrangement of lamps 9 and the reflected images transmitted by an optical arrangement of mirrors and lenses 8 onto a rotatable, suitably charged photoreceptor 7 on which the images are developed by a means 6 and transferred onto a substrate carrier 5 which substrate moves from a supply area 4, along a transport arrangement 3, past a fixing station 2 and is deposited in an output tray 1. As required, the optical arrangement 8 may provide for reduction of the reflected image. Accordingly, wide computer fan fold type output may be reproduced by the machine on more convenient, smaller sized paper. Further details of an exemplary xerographic machine may be seen in the above cited patents which are to be considered as incorporated herein by reference for that purpose. It will be understood however that any equivalent reproduction arrangement which produces copies of a document on a platen may be used with the invention.

The document strip handling means 10 for copying machine 12 includes a document strip moving means 50 for conveying an elongated document strip 16 across the exposure station or platen 14 of the copying machine, a control means 90 for regulating the operation of the document strip moving means 50 and the copying machine 12 to produce individual single sheet copies of portions of strip 16 as desired, and a support means 52 for the moving means 50 and control means 90.

It is significant that the support means 52 is readily fixable in predetermined position on the copying machine 12 to convert the machine from handling conventional single sheet documents to handling strip documents such as the computer fan fold print outs 16.

Whenever desired the strip handling means 10 may be removed from the machine 12 to return it to its original, conventional appearance and function.

It should be noted that even though the strip handling means 10 is readily removable, it is a feature of the invention that single sheet copying may take place with the means 10 in place. It is to be emphasised however that where a computer printout form will be copied only at certain times, for example on a periodic basis, e.g. end of each day, week or month, the strip handling means 10 provides great advantage in the fact that it may be applied to an otherwise conventionally appearing machine within a matter of seconds to allow most efficient automatic or "manual" copying of the form and then be removed, again in a matter of seconds, to return the machine to its original unencumbered form most familiar to the average user.

The document moving means 50 is preferably positioned adjacent the exposure platen or station 14 for conveying the strip 16 across the exposure station normally in the direction indicated by the arrows 19. Thus, as may be best seen in FIG. 3, a fan fold computer form is pulled by the moving means 50 from a stack in supply basket 18a, over the platen 14 and pushed to fall into a repository which may be a basket 18b on an opposite side of the copying machine 12.

The support means 52 includes a base 53 of a configuration which is compatible with the upper surface 13 of the machine 12. As shown, the base 53 is planar and rests on the planar upper machine surface 13. The support means 52 is detachably fixed in the predetermined position by suitable means. For example, we have obtained excellent results using a pin means 54 which includes, as schematically shown in FIGS. 2 and 3, a pair of pins 55, 56 that are attached to base 53 and projected downwardly so that when in position they are received into mating openings in the upper surface 13. Where permitted the pin means may include in lieu of or in addition to the pins 55, 56, a safe multi-contact electrical male-female plug arrangement in a location such as shown at 58a in FIG. 2 for forming an electrical connection with the copying means. This arrangement has the advantage of simplicity of construction and connection. Also, when it is in place, the strip handling means 50 will protect and conceal the connector.

When the handling means 50 is not in place, the presence of the safe electrical plug 58a on a far edge of the working surface 13 does not present any safety hazards. If required, a cover may be provided to prevent any accumulation of dust and dirt. Preferably the female socket portion of the plug 58a will be in the upper surface 13 and the male portion will depend from the base 53. Installation of the strip moving means 50 in this instance will thus involve essentially laying the moving means in position on the surface 13. Removal of the strip means to leave the machine 12 in its original unmodified state involves simply lifting the unit off the surface.

Alternatively, electrical connection between the machine 12 and the strip handling means 10 may be provided by positioning a safe electrical plug 58b on a portion of machine 12 not under the base 52 and running the electrical connection wires through a short cord 57 to a connecting plug. For example, a rear wall 113 adjacent the location of the strip handling means 10 provides a convenient position for the female portion. The male portion will be attached to the cord 57 extending from the strip handling means. Although an extra attachment motion is required this arrangement is less susceptible to dust and dirt accumulations. Approved connectors for the connectors 58a, 58b, are readily available.

Other arrangements for detachably securing the support means 52 in position on the machine 12 are contemplated to be within the scope of the invention. Thus, friction, gravity, mechanical, adhesive and magnetic means may be used in various combinations to prevent movement. Machine surfaces such as 13, 113 and the edge of the upwardly curved platen also provide movement inhibiting means which may be taken advantage of in combination with the above. Various factors may dictate the use of different combinations. Thus, if the moving means 50 and control means 90 are on separated portions of the support means 52 their movement might require means different from those shown for the illustrated embodiment where they are on an integral support means 52. Compliance with the various governing electrical and safety codes may also necessitate the use of different means for the same arrangement.

Conventional copying machines such as the model 7000 referred to above normally include a platen cover which functions basically to hold a document relatively flat against the platen, to provide a light reflecting background that avoids dark borders and increases copy quality and to prevent extraneous light from entering the platen when the machine is not in use. In the present embodiment the strip 16 is pulled by the strip moving means 50 across a curved platen 14 under a tension which in most cases should be sufficient to keep the strip 16 relatively flat against the platen. It is however still advantageous to keep the platen cover in place and hence it is a feature of the invention that a guide and platen cover support means 30 is included as a part of the strip handling means combination.

Figure 6:
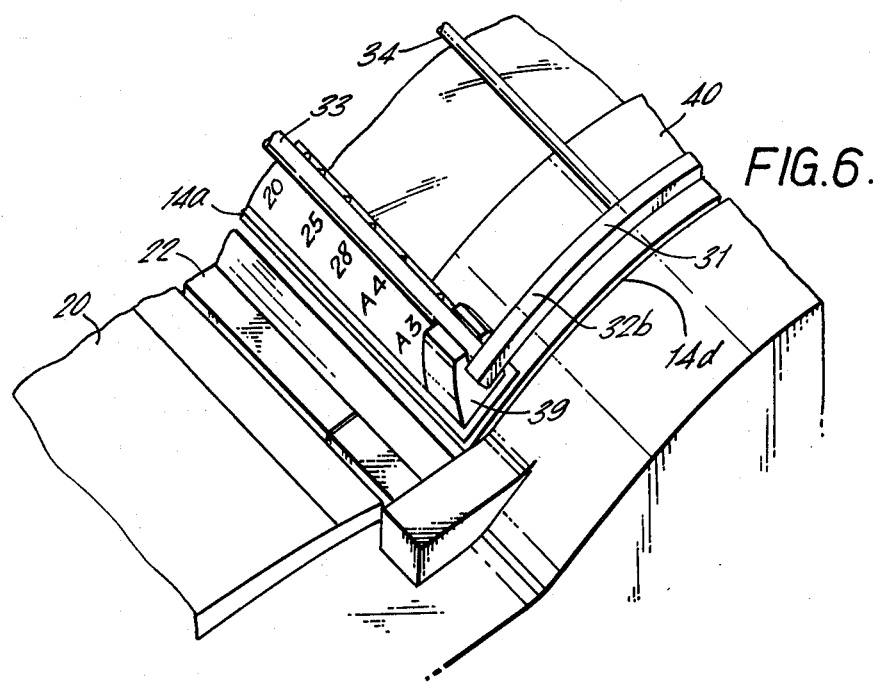
FIG. 6 is an enlarged view of an arrangement for attaching a guide and platen cover support means.

The guide and platen cover support means 30 is interposed between an upper surface of the exposure platen 14 and a lower surface of the platen cover 20 to allow easy movement of the web strip material 16 over the platen 14 while the cover 20 is in place. As shown, the means 30 includes a frame 31 having curved side members 32a, 32b, which are generally parallel to the surface of platen 14 along its sides 14c and 14d. Transverse members arranged generally parallel such as shown at 33, 34, 35, 36 and 37 extend between the side members 32a and 32b along their length. To allow quick and secure attachment the frame 31 may be removably secured in its operating position over the platen by means of a pair of upwardly opening brackets 38, 39, such as shown in FIG. 6, which are preferably positioned on opposite sides of the document path as for example in the corners of the intersections of side 14a with sides 14c and 14d. In this position the brackets 38, 39 receive the opposite ends of member 33 therein and secure it against lateral movement.

In one embodiment the member 33 may be of a generally oval cross-sectional configuration at least at the point of engagement with the bracket 39. With the longer axis of the oval generally parallel to the platen surface 14 and the short axis perpendicular thereto, the opening of the brackets 38, 39 is less than the long axis but greater than the short axis of the oval so that the frame 31 may be moved into the bracket by tilting it generally normal to the platen surface to insert it. Pivoting it downwardly parallel to the platen surface at this point effectively secures it in position against upward movement.

The flexible platen cover 20 advantageously is pivoted by a hinge means such as 22 along the same side 14a of the platen in a manner that will allow it to swing 180° and pivot up and lay over the platen with or without the frame 31 in place. It will be noted that the hinge 22 is spaced above the left hand portion of surface 13 so that the web of material 16 may pass therebetween.

Most computer printout forms include regularly spaced perforations 16a along at least one edge to allow a positive drive movement of the strip. When copying the forms it is desirable to eliminate these and other extraneous portions of the strip. Accordingly, there may be provided as part of the strip handling means 50 combination an opaque mask or template 40, a portion of which may be seen in FIG. 6. The template 40 is of a thin, light reflecting material and lies flat on the upper surface of platen 14 so that the strip 16 passes thereover. Various sizes may be provided as required to effectively mask exposure of the undesired portions of the strip. The template 40 is readily removable and lies in position without the need of additional securement.

Some of the functions of the document strip in both an automatic and "manual" modes of operation are to quickly and accurately pull the strip 16 from a source 18a across the platen 14, to stop it as required, and to move it on to a receiving tray 18b. Registration movements and "manual" operations may also be performed. We have found that these functions can be accomplished efficiently and reliably by a lightweight and relatively simple arrangement of a pair of spaced document drives 70, 72, adapted to engage the perforations 16a on the opposite edges of the document strip 16 to move it forward or backward.

The document drives 70, 72 are known in the art as shown for example in U.K. Pat. No. 1,262,399 and include a series of pins mounted on a chain in a continuous loop and positioned relative to the forms being fed so that the pins extend through the holes in the form and advance the web in the direction of drive. The drives 70, 72 are mounted on two parallel bars 64, 66 which in turn are secured between a pair of spaced ribs 60, 62 that upstand from base 53. The bar 64 is a splined drive shaft which is connected at one end by a suitable drive, e.g. belt 74 to a rotative power source 80 and transmits power to operate the document drives 70, 72. The splines on bar 64 provide power transfer and also allow movement of the drives 70, 72 along the bar. This lateral movement of the drives may be effected by rotation of bar 66 which extends through a bushing on the drives 70, 72 and is threaded in opposite directions at its opposite ends. Hence rotation of bar 66 by means such as a knurled knob 67 fixed to the end of bar 66 that extends through rib 60 causes the drives 70, 72 to move in opposite directions, i.e. toward or away from each other to accommodate various widths of web as shown for example in U.K. Pat. No. 1,223,426. Large openings 15a, 15b, are provided in a cover 15 to allow a wide range of movement of the drives.

As may be seen in FIG. 3, the base 53 in the area of the moving means 50 supports the cover 15 which is advantageously inclined upwardly in the direction of forward movement 19 of the strip document 16. The inclined arrangement provides sufficient room for the drive means 70, 72 at the upper end portion where the strip is above the point of exit 14b from the platen and the strip portion which is beyond the moving means 50. As a result the forces of the strip 16 tend to assist its retention by the drive means 70, 72.

Alignment of the drive means 70, 72 is parallel and such that the base of the drive pins are generally level with the upper portion of surface 15. As shown in U.K. Pat. No. 1,262,399 and U.S. Pat. Nos. 3,606,122, 3,774,485 and 3,825,162, the drive units 70, 72 may include pivotable guide plates which surround the area where the drive pins project through the strip 16 and serve to hold the document below the level of the pins so that adequate drive engagement is assured.

The control means 90 regulates the operation of the document strip moving means 50 and the copying machine 12 as will be hereinafter set forth in detail to produce a desired number of single sheet copies of the portions of strip 16. In the embodiment set forth the strip handling means functions in an automatic or what may be called a "manual" mode of operation.

In both the automatic and manual modes, the device normally operates by intermittently moving the strip 16 a specific length e.g. the length of the portion of a computer form which it is possible to copy to an area to be copied, stopping it, after which the copying machine 12 is caused to produce the desired number of copies of that fold and the strip is moved on to the next area. The control means generally indicated at 90 which regulates this operation may include a document length selection means 94, a copy count means 100, a plurality of strip presence detecting switches 110, 112, 114 and a control panel 120 including a plurality of human action switches 121-125, 130, 132, 134 and 136.

Figure 4:
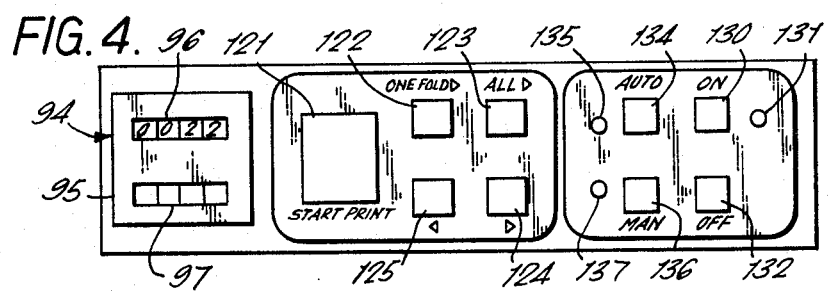
FIG. 4 is an enlarged view of the control means portion of the strip handling means.

As shown in FIG. 4 the control panel 120 may include a display portion 95 of the length selection means 94 whereby the predetermined length of strip material 16 to be advanced to the exposure platen 14 for each copy cycle may be controlled by setting on the display 95 the number of units e.g. half inches, which are in the length of strip 16 that is to be moved by the strip handling means. Thus, as the strip moves, the units are counted and relayed to the display so that when coincidence is reached with the number set on the display, the moving means will stop. Various means may be used for this purpose, however, in practice we have found it convenient to use the pulse counting device which includes a selected units display 96. This may be set for any number up to 10,000 i.e. 9999 by pushing a set button 97 under each display frame until the desired digit appears. Thus, for example, where each increment unit is one-half inch and it is desired to copy on each cycle a strip portion of eleven inch length, the display 96 would simply be set with the number 0022 as shown.

Counting of the pulses may be accomplished by an arrangement as shown in FIG. 2 which includes a microswitch 91 having a portion bearing on a notched cam 92 so that a pulse is generated by each notch. With the cam 92 rotating in synchronism with the drive bar 64 e.g. affixed to an extension thereof as shown, and the notches spaced along the perimeter of cam 92 in relationship to the diameter of drive means 70, 72, the increment of strip length which will generate a pulse may be exactly set. In view of the fact that the perforations on many computer output forms are at half inch intervals, the setting for a generation of a pulse for each half inch is very convenient. With this pulse increment and a display range from 0001 to 9999 it may be seen that automatic movements of the strip may each range in half inch movements from one-half to 5000 inches. This great range has many advantages. For example, it allows copying of any length print out portion from a one-line unit such as would be useful with labels or line selection devices to a long sequential run as might be required for duplexing. Duplex copying of the continuous strip 16 is easily accomplished with the invention herein by setting the length selection means at an increment equal to twice the length which would be normally copied so that alternate desired images on the document strip will be copied in two sequential passes of the document strip over the platen. After the first pass of the strip 16 in one phase, the output sheets in the tray 1 will be inverted and placed in the supply tray 4 in sequence so that on a second synchronized pass of the strip 16, wherein the images are copied one-off-phase, adjacent strip segments will be produced on the front and back of each output sheet 5. These, of course, lend themselves well to being bound in book form.

The control means 90 may include a counting and/or billing means 100 having for example a first counter means 101 which records the total number of increments of document strip which have been copied with the strip handling means in position i.e. the total number of different original documents presented by the handling means 10 to the machine 12 for copying, and a second counter means 102 which records the total number of copies made by the machine 12 with the strip handling means 10 in position.

The second meter 102 includes a microswitch-cam arrangement 103, 104 similar to 91, 92 which cooperate with the pulse counter 94 to determine the number of originals presented.

The human action switches on the control panel 120 include a "start print" button 121 in FIG. 4 which begins operation of the machine 12 when the handling means 10 is in position. This then overrides the "start print" button on the machine. To the right of the "start print" button in FIG. 4 are a plurality of generally self-explanatory strip drive control buttons which regulate movement of the strip 16. Thus, a "one fold" button 122 causes the strip to move forward i.e. to the right, one increment of length as set on the selection means 94. Activation of an "All" switch 123 causes the drive means 70, 72, to operate until all of the strip has passed the strip detection means 110. Activation of switches 124 and 125 cause the drive means to move in a forward or rearward direction respectively so long as they are engaged.

The "on" switch 130 and "off" switch 132 control power to the strip handler and a lamp 131 lights when the power is on. An "auto" switch 134 allows automatic operation of the strip handler to produce the number of copies selected on a copy selection control 118 on the machine 12. A lamp 135 indicates when the "auto" switch 134 is activated. A switch 136 which may be identified as "man" operates the machine in a "manual" mode wherein the appropriate strip movement switch 122 through 125 must be used to locate the strip on the platen, and the "start print" switch 121 must be activated to effect copying. A lamp 137 indicates when the "man" switch 136 is on.

The first strip sensing or detecting means 110 is positioned on the upstream edge 14a of the platen as shown in FIGS. 2 and 3. Preferably it is centrally located along the platen edge and comprises a photoelectric means positioned below the hinge portion of platen cover 20. The photocell means includes a lamp 161 inclined at an angle and aimed at a point on the bottom of the hinge portion 22, and a photosensitive member 162 aimed generally toward the same point on the hinge. The hinge portion 22 in the area of the point at which the units 161, 162 are aimed has a light absorbing finish so that not enough light will be reflected to be sensed by the member 162. When, however, the strip of material 16 is in position the area will be covered by a relatively highly light reflecting paper so that its presence will be detected by the member 162. Second and third strip presence detecting means 112, 114 respectively may be positioned adjacent drive means 70, 72 respectively to provide a signal if the strip edges are not present when they should be. They may take the form of microswitches with wire feelers and function in a manner as will be hereinafter described.

Automatic operation is advantageous where the number of copies to be made is the same for each portion of the strip to be copied. In such cases the number of copies to be made of each original is selected on the copy selection 118 on the machine 12, the "auto" switch 134 is engaged and the "start print" control 121 is touched to activate the means 10. Copies are then made automatically on a continuous basis until the trailing edge of strip 16 passes over the detection means 110. To clear the strip through the moving means 50 at this point the strip "All forward" advance control 123 is engaged. This keeps the document drives 70, 72 running until the strip has cleared the microswitches 112, 114.

Operation in the "manual" mode is particularly adapted for the situation where the number of copies to be made of each strip segment may be different. For this type of operation the "man" control 136 is touched and after the number of copies to be made of each original portion has been selected on control 118, the "start print" button 121 causes that quantity of copies to be made. At this point the strip 16 does not advance, but must be moved forward by activation of the "one fold ▷" control 122 or control 124. Again the number of copies to be made is selected and the "start print" control 121 activated. This process is repeated for each document.

The designation of the operation in terms of "automatic" and "manual" is for purposes of description only and should not be considered as limiting the scope of the invention. Thus, the "one fold forward" control 122 might, in further distinction, be considered as being of a "semi-automatic" nature. What is significant is the fact that the invention provides a great flexibility of operation in a simply constructed and simply operated readily attachable accessory.

A further example of the flexibility of the strip handling means is its adaptability for use as a "line selection" type device whereby an overlay having an opening of say one line width is laid on the platen and the computer printout is moved to change the image portion over the opening every predetermined number of copies or as required. Thus, the overlay may be a standard item such as a cost accounting form and the strip may contain a printout of a list of parts and items to be individually copied in combination with the standard form. This ability to produce a great number of distinctive copies by combining two documents is highly advantageous for the recording of business transaction type documents. The ability to select a wider range of lengths in very small increments is particularly important for this use.

Briefly, it may be seen that operation of the feeder means 10 is effected by placing the forms 16 to be reproduced, e.g. computer fan fold, in the basket 18a and threading the forward end under the cover hinge 22, under the support frame 31, and across the moving means 50 so that the perforated edges 16a are securely meshed with the tractor or pin feed drive means 70, 72. At this point the "on" button 130 may be activated. If the web 16 has been correctly placed in the drive means 70, 72 the "on" lamp 131 will light. Registration of a forward edge of a segment of the strip or web 16 is then accomplished by use of the location switches 124, 125. With a computer form a fold or transversely weakened portion usually separates the segments and this visible line provides a convenient registration point with a line 181 in FIG. 1 on the cover 15.

Figure 5:
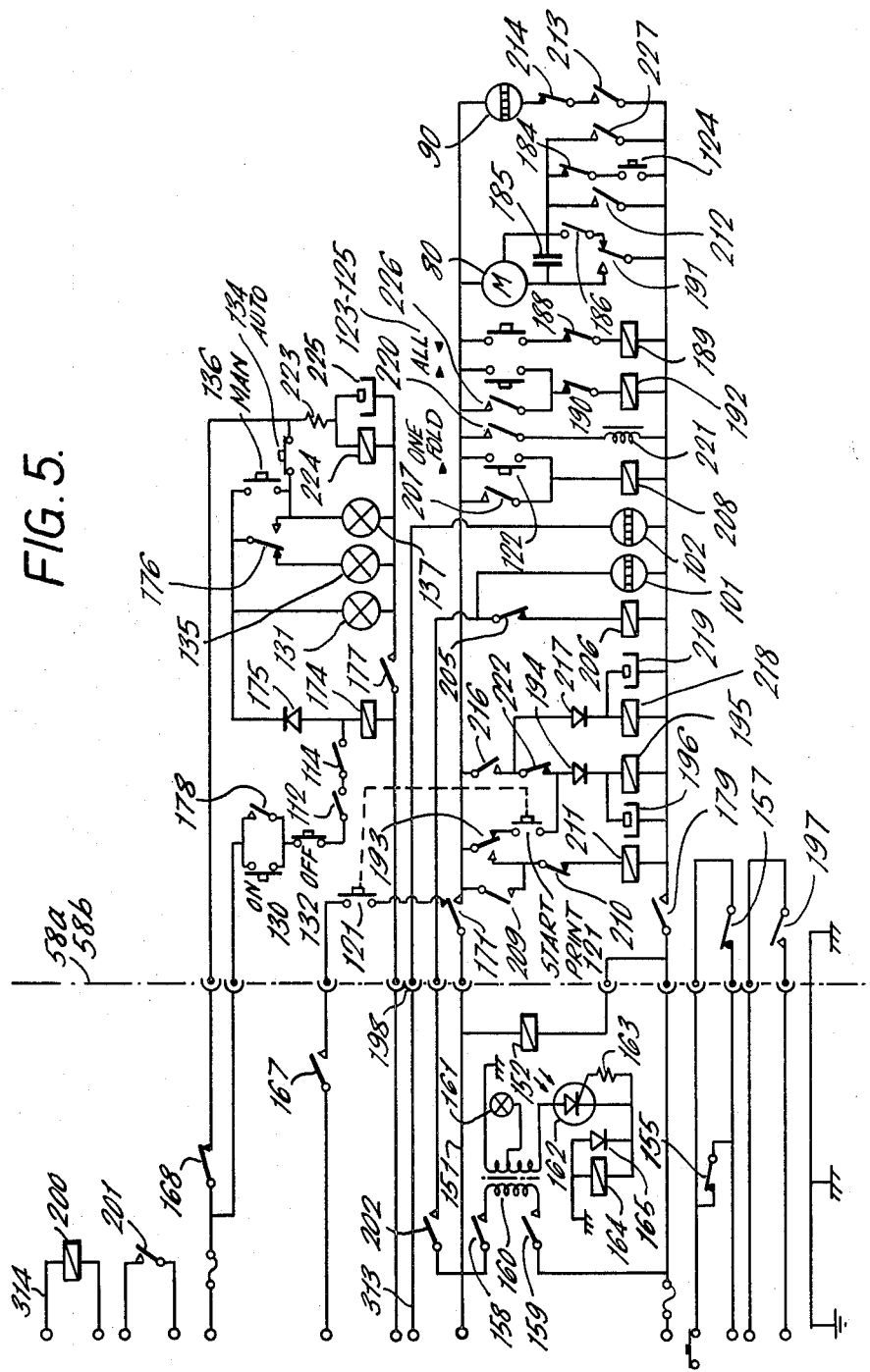
FIG. 5 is a circuit diagram of the related strip handling means and copying machine control means.

The various operations of the moving means 50 and control means 90 and their integration with the operation of machine 12 may be more fully understood in detail by referring to the schematic wiring diagram set forth in FIG. 5. The vertical dash-dot line in the diagram in effect represents the electrical connection 58a or 58b. Thus, the wiring in the copying machine 12 is on the left side of the dash-dot line and the wiring in the strip handling means 10 is to the right of the line.

Referring to the FIG. 5 it will be seen that when the document strip handling means accessory 10 is placed on the copying machine or processor 12 the plug 58a or 58b is inserted into a circuit 151 that activates solenoid 152, which in turn opens a normally -closed contact 155 and closes normally -open contacts 158, 159. Opening of contact 155 puts the "start print" control of the processor 12 under the control of the strip handling means "start print" switch 121. Closure of contacts 158 and 159 gives power to a transformer 160, the lamp 161, and, when a white reflecting surface is present, the photo-thyristor 162 with its accompanying circuitry 163, 164 and 165.

When the photothyristor 162 does not sense any light it remains open. The adjustment of the amount of light detected may be varied by adjusting a resistor 163. The presence of paper strip 16 is detected by the light reflected to the thyristor 162 and the internal resistance of the thyristor will drop so that a solenoid 164 will be activated. A rectifier 165 avoids chatter of solenoid 164.

Activation of solenoid 164 closes a normally open relay contact 167 and opens a normally closed contact 168. Closing of relay 167 brings power to the start print button 121, so that closing of 121 turns on the exposure lamps 9 in the processor 12. A second contact 168 will be opened to put the "manual" and "automatic" functions under control of the switches 136 and 134 respectively. Thus, with contact 168 open, power goes to switch 130 and a contact 178. Closing of the "on" switch 130 allows power to pass through the normally closed off switch 132, through microswitches 112, 114, if they have been closed by the presence of paper in the paper drive units 70, 72; to a solenoid 174, and a diode 175, to "on" lamp 131 and "auto" lamp 135. Activation of the solenoid 174 closes contacts 178, 171, 179, 177. Closure of 178 allows release of the "on" button 130. Closing of contact 177 brings power e.g. 24v. to the power control circuit while closure of contacts 171 and 179 brings power e.g. 115v. to the strip control circuit.

At this point the strip handling means 10 is in the "on" position and in the "automatic" mode. With contact 171 closed the start print button 121 functions to allow power to flow to the processor 12.

Registration of the strip must be effected before printing can commence. Registration is effected by bringing the fold into line with a set of guide lines 181 on the cover 15 designated for different sizes. If the fold is not in alignment with its specific guide line 181 the operator must press button 124 to move the web forward or button 125 to move the web backward. When forward button 124 is depressed power flows through a normally closed contact 184 to the motor 80 to the right of a phasing capacitor 185 to drive it in the forward direction. When the backward button 125 is closed power flows through a normally closed contact 188 to activate a solenoid 189 which in turn changes a contact 191 to give power to motor 80 via the left side of phasing capacitor 185; opens contact 184 to limit power to one side of motor 80; and opens 190 to assure only forward operation. A cam 187 will maintain a contact 186 closed until a set increment of strip length previously determined on selector 94 e.g. one half inch, has passed after the contact 191 changes. This assures that the registration moves in set increments of for example one-half inch.

With the strip 16 in registration, the copying cycle will begin with depression of the "start print" button 121. This brings power through a diode 194 to a solenoid 195, a capacitor 196, and, if contact 222 is closed, to solenoid 218, capacitor 219 via diode 217. The solenoid 195 changes the position of contacts 157 and 197 which will provide power to the copying machine. The diode 194 and capacitor 196 ensure that solenoid 195 has sufficient time to function to make a good contact.

With the copy machine running, each sheet of paper 5 activates a microswitch not shown in the machine which microswitch sends a count pulse through a line 313 and a plug 198 to counter 102. When coincidence is reached between copies selected and copies made as shown on selector 118 a signal is sent through a line 314 to a solenoid 200 which activates to move contacts 201 and 202. Closing of contact 201 stops the processor 12 and closing of contact 202 provides a pulse to counter 101 which registers the number of originals copied. Closing of contact 202 also activates solenoid 206 to close contact 207 and activate solenoid 208. Activation of 208 closes a normally open contact 209 to provide power to solenoid 211 through a normally closed contact 210. Solenoid 211 in turn draws contact 193 clockwise as shown thereby isolating the start print switch 121.

Changing contact 193 again activates solenoid 211 through contact 210 to hold itself. Solenoid 211 also closes contacts 212 and 213. Closing of 212 causes the motor 80 to run forward and 213 puts counter 94 under control of switch 214. When counter 94 receives the preselected number of pulses it closes contact 216 which activates solenoids 218 and 195 to stop the accessory and start the copying machine respectively. Solenoid 218 is held for a longer period of time by diode 217 and capacitor 219 to allow sufficient time to reset counter 94. The same pulse of contact 216 also activates solenoid 195 which, as mentioned, is held open by diode 194 and capacitor 196 to allow sufficient time to allow complete printing. Solenoid 218 opens contact 210 and closes 220. With 210 open solenoid 211 is deactivated stopping motor 80. Closing of contact 220 activates electromagnet solenoid 221 which resets counter 94 to the pre-selected valve and opens contact 216. The processor continues to run until the selected number of copies are made after which the cycle begins again. This continues in the automatic mode until the trailing edge of the strip passes the beam of photocell 110. At this moment 164 is deactivated thereby closing contact 168 to bring power to a solenoid 224. Resistor 223 and capacitor 225 delay activation of solenoid 224 a short time e.g. on-half second to provide time for the web to properly register and thereby fully register on counter 94 to close contact 216. With this arrangement the processor may begin to make the copies of the last segment of the web before activation of solenoid 224. Activation of solenoid 224 changes contact 176 from the normally closed position to the normally open position thereby extinguishing lamp 135 and lighting 137. Solenoid 224 also opens contact 205 to prevent the changing of the original when a copy is made in the normal mode. Also contact 222 is opened to prevent activation of the copying machine "start print" switch by solenoid 195 so if a segment is moved forward enough to activate counter 94 the pulse does not start the copying machine.

Solenoid 224 may be activated by either contact 168 or by pushing "manual" button 136. This has the effect of bringing the power via 178, 132, 112, 114, 175, 136 to solenoid 224. Manual button 136 must be depressed until the capacitor 225 has changed, e.g. one second. This puts the machine in "manual" mode. In this mode the processor does not make copies when the registration is determined and the strip will not move a segment when the selected copies have been made.

The function of the "one fold forward" button 122 is used to move a page of the web 16 without a copy being made. In this case the copying machine will be put in the "manual" mode by pushing button 136 and then touching button 122 thereby bringing power to solenoid 208 and closing contact 209 causing the motor to begin to run.

The function "all forward" of button 123 is used to continuously move the portion of web 16 for which copies are not required. When button 123 is puhsed, power is given to solenoid 192 via contact 190. Activation of 192 maintains contact 226 closed, it opens contact 188 and closed 227. Opening of contact 188 prevents inadvertent activation of the rearward button 125. Closing of contact 227 allows the motor to run so long as solenoid 192 is activated. Thus, the motor will run until the trailing edge of web 116 passes the switches 112 or 114 or until the "off" button 132 is pushed.

If malfunctions somehow occur in the copying machine or strip handling means they will be detected by various means and the operation stopped before damage can occur.

Basically there are three types of malfunction which may occur with the strip handling means on the machine. With a paper jam in the strip handling means where the web 16 leaves the switches 112 or 114 they deactivate solenoid 174 to shut power off in all circuits of the accessory. If the web is torn along an edge so that the switches 112 or 114 are open the automatic operation will not function however the control is set so that copies may be made manually.

Where there is a jam in the processor or sorter and the copy has been made and counted the strip handling means will forward the next segment for copying. This page will stop in registered position but the processor will not print because it will not be ready. If this copy is destroyed the accessory must be moved one segment backwards. At a low paper or timed shut down initiated by other reasons the web will not advance because the relay solenoid 200 has not been activated. The relay 200 can only be activated by counting coincidence and hence automatic operation will not be possible. It should be noted however that manual operation will be possible. Where a malfunction occurs in the strip handling means 10 which cannot be readily repaired it is a very important advantage of this invention that the means 10 may be quickly removed by the operator for repairs and a replacement attached in its place, again by the operator. Accordingly, the use of the copying machine 12 will not be impacted by a malfunction of the accessory 10.

From the foregoing it will be understood that we have provided a relatively simple, yet reliable, strip handling apparatus which may be quickly mounted on or removed from a substantially unmodified or conventional copying machine by an ordinary operator to convert the machine to automatically or manually copy sequential portions of elongated documents such as computer forms in an accurate, versatile and efficient manner.

While the principles of the invention have now been made clear in an illustrative embodiment, it will be appreciated that various modifications of structure, arrangement, proportions, the elements, materials, and components, used in the practice of the invention, and otherwise, may be made by those skilled in the art which are particularly adapted for specific environments and operating requirements without departing from those principles. The appended claims are therefore intended to cover and embrace any such modifications, within the limits only of the true spirit and scope of the invention.

What we claim is:

1. A document strip handling means for converting a copying machine which copies separated original documents to copying original documents interconnected in succession with one another in the form of an endless strip comprising strip feeding means for feeding said endless strip across an exposure station of said copying machine, a control means for regulating the operation of said strip feeding means and said copying machine to produce copies of individual original documents on said endless strip as desired, and a support means for said strip feeding means and said control means, said support means being readily fixable in predetermined position on said copying machine to convert said machine from copying separated original documents to original documents interconnected in the form of said endless strip and being readily removable from said machine for reconversion of said machine back to copying separated original documents, said support means including a base adapted to rest on a surface of said copying machine, said base having pin means projecting downwardly for engagement with mating openings on said machine surface to fix said support means in predetermined position, at least one of said pin means having a plurality of contacts for electrically coupling said support means with said copying machine, said control means including a first counter means which records the total number of original documents from said endless strip which have been copied with the strip feeding means in position and a second counter means which records the total number of copies from the original documents on said endless strip made by the machine with the strip handling means in position.

2. A document strip handling means according to claim 1 wherein said exposure station on said copying machine is adapted to include a transparent platen across which said endless strip passes, said strip handling means including an opaque mask adapted to lie on said platen to block out a predetermined area of the platen on each exposure.

* * * * *